May 16, 1939. J. F. CARTER 2,158,399
LIFT STRUCTURE
Filed Aug. 4, 1937
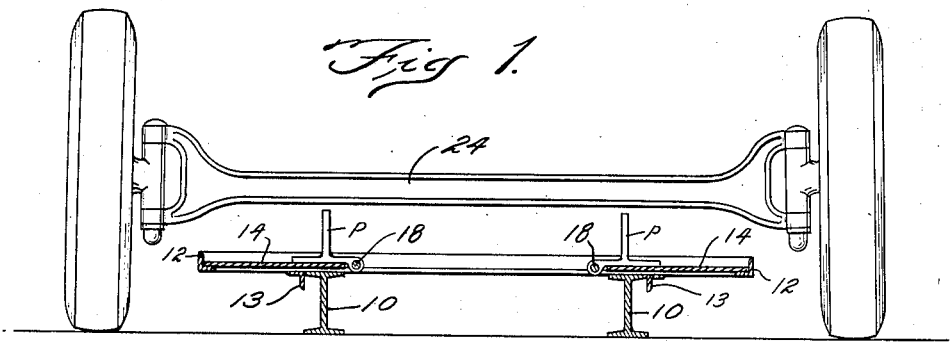
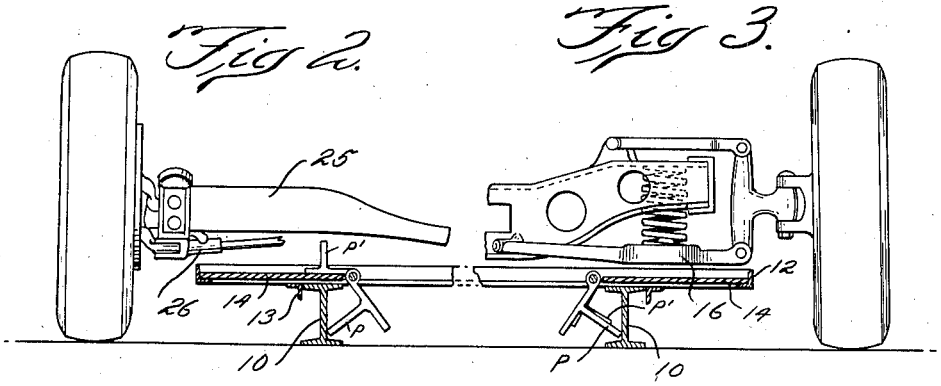
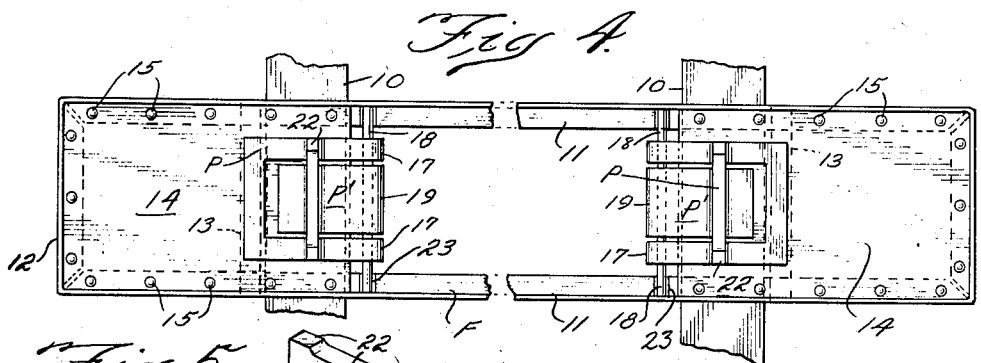
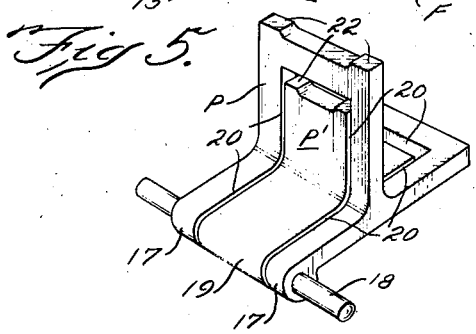
Inventor:
John F. Carter
By:- Bair & Freeman
Attys.

Patented May 16, 1939

2,158,399

UNITED STATES PATENT OFFICE 2,158,399

LIFT STRUCTURE

John F. Carter, Defiance, Ohio, assignor to Modern Equipment Corporation, Defiance, Ohio, a corporation of Ohio Application August 4, 1937, Serial No. 157,323

4 Claims. (Cl. 254—89)

An object of my invention is to provide a lift structure for automobiles and the like with means to support the front axle of the automobile, which means is comparatively simple and inexpensive to manufacture.

In connection with automobile lifts, there is a serious problem involved in providing an axle support, particularly for front axles of automobiles which are now of many different types. A front axle support which is universally adaptable for the different types of axles is desirable instead of having to provide different supports for the different axles and having to interchange such supports. One of the main objects of my present invention therefore is to provide an axle support having axle pads for engagement with particularly those types of knee action axles, employing coil springs and spring pads, the axle pads of my axle support being designed to engage said spring pads.

A further object is to provide pillar blocks which may be interposed between the axle pads and other types of knee action or straight axles, the pillar blocks comprising preferably a pair of block elements, one of greater height than the other one, and these blocks being nested one within the other in such manner that either of them can be used without interference with each other.

Another object is to provide an axle support including a frame having axle pads adjacent the ends thereof and pillar blocks which are swingably mounted so that they may be swung selectively to a position on the axle pads or a depending position where they are out of the way of axle parts resting on the pads.

With these and other objects in view, my invention consists in the construction, arrangement and combination of the various parts of my lift structure, whereby the objects contemplated are attained, as hereinafter more fully set forth, pointed out in my claims, and illustrated in the accompanying drawing, in which:

Figure 1 is a transverse, sectional view through a pair of automobile lift beams and a longitudinal sectional view through an axle supporting member embodying my invention, the supporting member being mounted on the lift beams and the tall pillar blocks being shown in position for use with a straight axle.

Figure 2 is a similar sectional view showing the short pillar block for use with one type of knee action axle.

Figure 3 is a similar sectional view showing both pillar blocks out of the way and the axle pad being used for a coil spring type of knee action axle.

Figure 4 is a plan view of my axle support; and

Figure 5 is a perspective view of the pillar blocks.

On the accompanying drawing, I have used the reference numeral 10 to indicate a pair of longitudinal beams of an automobile lift, such as shown in the application of Don D. Myers, Serial Number 39,939, filed September 10, 1935, patented November 15, 1938, as Patent No. 2,136,750.

My axle support comprises a frame member F formed of angle iron or the like, having a pair of side members 11 and a pair of end members 12. The frame F is adapted to rest on the beams 10 as illustrated and to be moved longitudinally thereof so that it can be adjusted for automobiles of long or short wheel base as required.

Lateral movement of the frame F, however, is undesirable and to limit such movement, I provide a pair of angle bars 13 secured transversely of the frame F on its under surface. These, as shown in Figure 1, engage the outsides of the beams 10, thus permitting longitudinal movement of the frame along the beams but limiting any lateral movement relative thereto. Thus I insure that the frame F will remain centered relative to the beams 10 in all positions of adjustment of the frame F.

I provide axle pads 14, which are plates suitably secured to the frame F. By way of illustration I illustrate rivets 15 for this purpose. The pads 14 are normally adapted to engage the spring seats 16 of the type of knee action axle illustrated in Figure 3.

In connection with my axle support, I provide a pillar block assembly comprising a relatively tall pillar block P and a relatively short one P'. This assemby is perhaps best shown in Figure 5. The block P has a pair of perforated ears 17 adapted to pivot on a pivot rod 18. The pillar block P' has a perforated hub 19 which is also pivoted on the rod 18.

It will be noted that the pillar block P' normally assumes a position within or enclosed by the pillar block P. The block has a cutaway portion, the edges of which are indicated at 20 to accommodate the pillar block P'. The pillar blocks P and P' are formed T-shaped and are provided at their upper ends with projections 22 to prevent dislodgement of the axles of an automobile therefrom.

The pillar block assembly is mounted on the frame F by welding the ends of the pivot rod 18 to the longitudinal elements 11 thereof as indicated at 23 in Figure 4. Thus the pillar block assembly is permanently mounted relative to the frame and in such position that the pillar blocks may be swung either onto the plates 14 or to a position depending therefrom as shown respectively in Figures 1 and 3. In their depending position they swing against the beam 10.

As shown in Figure 1, when it is desirable to use the lift for lifting an automobile having a straight axle 24, the taller pillar blocks P are used. They are shown in this figure as interposed between the plates 14 and the axle 24.

Another type of axle 25 is shown in Figure 2, this being one of the knee action types of axles, which do not have a spring coil pad. This type of axle has a steering knuckle 26 which, if one of the pillar blocks were not used, would engage the axle pad or frame F instead of the axle 25 doing so. Accordingly the short pillar block P may be used and due to the construction of the pillar block assembly the tall pillar block P may be swung to a position out of the way where it does not interfere with the use of the shorter pillar block.

My axle support arrangement provides convenient and readily operable means to accommodate all types of automobile axles without, however, having any loose parts which might become lost from the support. It is a very simple matter to adjust the pillar blocks so that either the tall one or the short one can be used or both of them can be moved to an out-of-the-way positon when it is necessary to use the axle pads.

Some changes may be made in the construction and arrangement of the various parts of my lift structure, without departing from the real purpose of my invention, and it is my intention to cover by my claims any modified forms of structure or use of mechanical equivalents which may be included within their scope.

I claim as my invention:

1. In an axle support for use with an automobile lift or the like, a supporting member having an axle pad, a pair of pillar blocks adjacent said axle pad, one of said pillar blocks being larger than the other, each of said pillar blocks being movable relative to said axle pad to either a position of non-interference with the positioning of an automobile axle on the pad or a position of interposition between the axle pad and the automobile axle, the larger of said pillar blocks being framelike and the smaller one being receivable therein.

2. In a lift structure, an axle support comprising an elongated member having a pair of spaced axle pads engageable with the axle of an automobile or the like and a pair of pillar blocks, one for positioning on each of said axle pads, a hinge pin mounted on said support for each of said pillar blocks, said pillar blocks being hinged on said hinge pins and selectively swingable to a position depending from said hinge pins to permit use of the axle pads or to a position on said axle pads, each of said pillar blocks comprising a pair of elements, one of said elements having an open center capable of receiving the other one, said elements being of different heights and both of said elements being hinged on its hinge pin.

3. For use with a pair of lifting beams of an automobile lift or the like, an axle support comprising an elongated member for transverse mounting on said beams, said elongated member comprising a rectangular frame having an open center, an axle pad at each end thereof for engagement with the axle of an automobile, and a pair of pillar blocks, one for positioning on each of said axle pad plates, said pillar blocks being hinged adjacent the inner edges of said axle pads and swingable through the open center of said rectangular frame to a depending position between said beams to permit use of the axle pads.

4. In an axle support for spaced rails of an automobile lift, a rectangular open frame, axle pad plates mounted on said frame adjacent the ends thereof and spanning the open space between the sides of said ends and pillar blocks pivoted relative to said frame and plates to assume positions on the plates or to swing through the open center of the frame to a depending position between the rails on which the axle support is mounted.

JOHN F. CARTER.